July 21, 1964   R. L. CHAPMAN ETAL   3,141,243
AUTOMATIC TUTORIAL SYSTEM
Filed March 27, 1961   6 Sheets-Sheet 2

Fig. 2

ROBERT L. CHAPMAN
JAMES E. BROWN, JR.
JANETH T. CARPENTER
CLYDE M. WYMAN
         INVENTORS

BY
   FRASER AND BOGUCKI
         ATTORNEYS

July 21, 1964  R. L. CHAPMAN ETAL  3,141,243
AUTOMATIC TUTORIAL SYSTEM
Filed March 27, 1961  6 Sheets-Sheet 4

ROBERT L. CHAPMAN
JAMES E. BROWN, JR.
JANETH T. CARPENTER
CLYDE M. WYMAN
INVENTORS

BY

FRASER and BOGUCKI
ATTORNEYS

July 21, 1964   R. L. CHAPMAN ETAL   3,141,243
AUTOMATIC TUTORIAL SYSTEM
Filed March 27, 1961   6 Sheets-Sheet 6

Fig. 9
DATA RECORDER SYSTEM 24

Fig. 8
TAPE CONTROL UNIT 18

ROBERT L. CHAPMAN
JAMES E. BROWN, JR.
JANETH T. CARPENTER
CLYDE M. WYMAN
INVENTORS

BY

FRASER AND BOGUCKI
ATTORNEYS

3,141,243
AUTOMATIC TUTORIAL SYSTEM

Robert L. Chapman and James E. Brown, Jr., Littleton, Colo., Janeth T. Carpenter, Canoga Park, Calif., and Clyde M. Wyman, Aurora, Colo., assignors, by mesne assignments, to The Bunker-Ramo Corporation, Canoga Park, Calif., a corporation of Maryland
Filed Mar. 27, 1961, Ser. No. 98,502
19 Claims. (Cl. 35—9)

This invention relates to the behavioral and the tutorial arts, and particularly to devices and systems for the investigation and furtherance of learning and behavioral processes, and more particularly to automatic tutoring machines.

Modern scientific instruments having information storage and automatic control capabilities are now being widely used in investigating human behavior and in presenting information in organized fashion. Particularly attractive and immediate applications are found in the tutorial arts, in which bodies of information may be presented in varied sequences, determined by an individual's responses and selections, so as to facilitate both the acquisition of facts and the comprehension of ideas. Properly employed, these machines provide excellent individual instruction, because the order of presentation may be scientifically arranged to elicit revealing responses from an individual student which are then utilized to control further presentations. This not only frees an instructor from the bulk of the work involved in tutoring, but when properly arranged enables presentation and comprehension of a great body of information at a high rate of speed. These machines have additional advantages, because, inherently and by design, they can stimulate an individual and demand his concentration so that the intensity of effort which is realized is apt to be much higher than is attained by conventional techniques.

It may readily be seen that there is considerable potential in a machine having greater capabilities than the relatively simple tutoring devices which merely select different alternatives at each step in a controlled development of thought. For example, a familiar problem involved in tutoring is that of testing for the ability to apply abstract ideas to significant contexts. The presentation sequence needed for effective transmission of the abstraction to the student, however, may be far different from that needed in testing for the ability to apply the abstraction. For proper fulfillment of its purpose, therefore, an automatic tutoring machine must have considerable automatic selection capabilities and high presentation and display capabilities.

One may also readily appreciate that factors of intelligence, background and temperament can materially affect the manner in which a presentation should be made to a given individual. Some persons will be far more stimulated and responsive to visual phenomena than aural phenomena, for example. Individuals with a wide general acquantance in a given field may, for a time, be much more perceptive of the facts and ideas involved in a given presentation than are others. Because of social and perhaps other factors, the ability to concentrate and comprehend is often severely impaired at certain times and under certain conditions.

The ability to modify the nature and the rate of a presentation is therefore significant as regards the purely tutorial device. The same device, however, may readily provide a record of the responses and selections made by an individual, and hence may serve as a psychological and behavioral testing tool. Both the nature and the time required for a response evince something of the characteristics of an individual. A succession of responses from an individual under controlled conditions provides much meaningful information, as do the different responses of a number of individuals under like circumstances or like sequences of events.

The relationship between the tutorial and behavioral aspects of a machine having these extended capabilities becomes evident when it is recognized that other facts than the responses alone may be utilized to modify the modes and sequences in which information is presented. A machine should, in effect, be capable of eliciting and evaluating information having more than a merely "right-wrong" significance. The time required to make responses is often significant. Similarly, the selection of one of a number of alternative answers, or of a sequence of particular answers, may be as meaningful to the trained observer as a sequence of exactly correct answers.

The attainment of an optimum learning state for an individual, therefore, requires the provision of a machine which makes best use of the behavioral characteristics evidenced by the individual. The existence of these capabilities in turn creates a scientific instrument for the behavioral arts. The tutoring and behavioral devices heretofore available, however, have not thus combined display capacity, selection capability and individual response control to best advantage. General purpose computers have been used for giving individual tutorial instruction, but it is quite evident that this is merely an expensive investigative technique and not seriously contemplated for use with large numbers of students. Practical tutorial machines for individuals have been confined to rather simple decision-making steps in a set routine and have provided little behavioral control or response.

It is therefore an object of the present invention to provide an improved machine for the automatic and purposeful presentation of information to an individual based upon selective responses by the individual.

It is another object of the present invention to provide an automatic tutoring device having greater capacity for information presentation and greater facility in automatic selection than has heretofore been utilized.

Yet another object of the present invention is to provide an improved scientific instrument having the capability of providing optimum learning conditions as controlled by behavioral patterns.

A further object of the present invention is to provide an improved scientific instrument for behavioral and psychological research.

In machines in accordance with the present invention, the initial presentation of information to an individual is accompanied by an indication of choices available to the individual. Single or successive choices thereafter made by the individual in conjunction with the integrated presentation of a wide variety of information may thereafter result in the initiation of a sequence by which optimum learning is achieved.

In one arrangement in accordance with the invention, given merely by way of example, a multi-track magnetic tape storage device is used as a combined aural presentation and program control, while a still and motion picture projector is utilized as a visual display. Coded program information disposed in selected groupings in the multiple tracks of the magnetic tape storage device preconditions selection circuitry, so that given responses by an individual are used, in conjunction with the information from the magnetic tape, to select the track on the magnetic tape from which instructions are to be derived to control the next succeeding display. Thereafter, both the magnetic tape device and the visual display device are rapidly moved to selected addresses, at which further presentations are made and selections are offered to the individual, while the information necessary for the selection of the next succeeding step is assembled. As the selections are made by the individual in response to the proffered choices, information as to the actual selection and the time latency of the response may be recorded for independent examination.

A feature of the present invention is the highly integrated use of a multi-track storage device for both preconditioning the system for operation in accordance with any given response, and for using the response in conjunction with the storage device itself to establish the next succeeding step or steps in the presentation. This interrelationship enables the command function to be concentrated in the storage device, so that the parts of the system are relatively simple, even though great latitude and versatility are made possible in the sequences and displays which are used.

Another feature of the present invention is the use of recorded program information in the form of cyclic signals having selected numbers of cycles, together with counting registers which store as well as represent the program information. Systems thus arranged provide remarkably wide selection capabilities with relatively few components.

Another feature of systems in accordance with the present invention is the provision of means for selecting steps in a sequence in accordance with either individual responses, a series of previous responses, or a group of interrelated responses. A series of responses may be scored as to their significance, and then successively compared to standard values which are read from the storage device. In a specific example of this arrangement, the system undertakes a selected sub-routine on reaching a multiple branching point. Different weighted command values are successively read from the storage device and successively compared to weighted response values contained in different registers. The results of the comparisons may determine the next sequence to be used or initiate the use of a remedial sequence before proceeding on with further comparisons.

The comparison system is particularly economical, because it uses counter registers which are set to complementary values and which are then successively advanced by command signals from the storage device so as to provide an output signal only when a given equality relationship exists between the stored value and the standard which is used for the comparison.

A better understanding of the invention may be had by reference to the following description, taken in conjunction with the accompanying drawings, in which:

FIGURE 5 is a block diagram representation of a unit for providing a control selection function in the system of FIGURE 1;

FIGURE 6 is a block diagram representation of a unit for providing a pre-response control function in the arrangement of FIGURE 1;

The system which is given below by way of example may be widely varied to augment or limit certain capabilities in accordance with the use to which it is desired to put the system. If it is desired to utilize systems in accordance with the invention as primarily tutorial and not behavioral instruments, the capacity and versatility of the display and presentation devices which are used may be augmented, while the data recorders which are used in providing a record of responses and conditions may be limited or eliminated. On the other hand, the data recorder portion of the system may be greatly augmented if it is desired to emphasize the use of the system as a behavioral instrument. While a number of alternatives are pointed out in conjunction with different parts of the system, it should be borne in mind that the state of the art in storage devices, display devices and control circuitry is such that a wide variety of other alternatives also may be used within the spirit of the invention.

Figure 1:
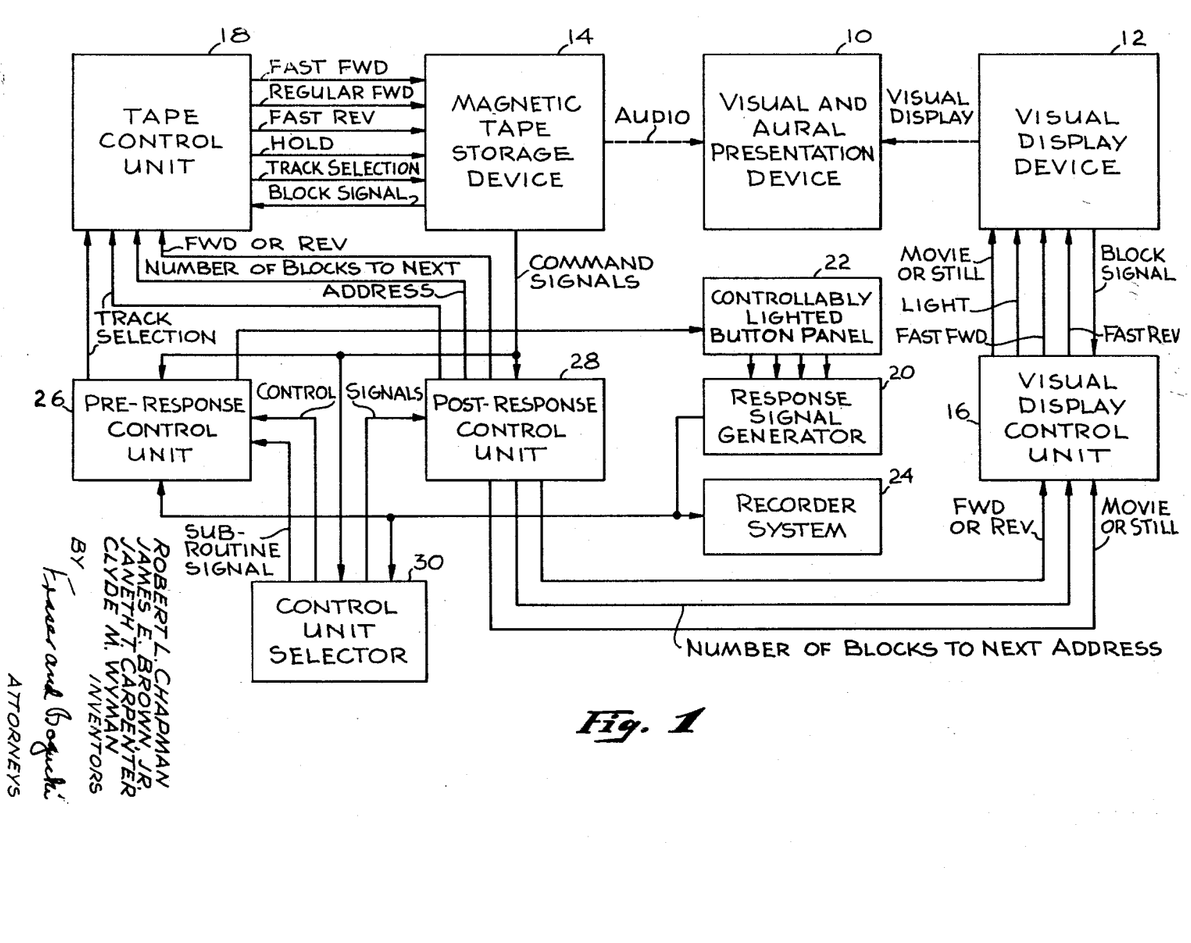
FIGURE 1 is a block diagram representation of the principal elements of a scientific instrument in accordance with the invention.

The principal functional elements of a system in accordance with the invention are shown in FIGURE 1. The individual subject who is to govern the operation of the system is provided with a visual and aural presentation device 10, the visual display usually being presented on a ground glass or similar screen, while the aural presentation is made through earphones or a suitable speaker system. The visual display device 12 is in this example a motion picture projector having provision for showing single frames, and a controllable illumination lamp. The projector is also preferably provided with means for driving the film at a high speed forwardly or reversely (disengaging the advance mechanism if need be) so as to locate specific sections of the film strip in minimum time. The single frames and motion picture sequences on the film are themselves arranged in a pre-selected and known order. Each individual frame or sequence of frames may be signalled by a switch which is actuated by the claw mechanism which advances the film. As a different example, the separate frames or sequences of frames may be divided into blocks by conductive strips affixed to the film, and the presence of these conductors may then be detected by brushes or other circuit contacts. As another example, an optical sound track provided on the film may contain index marks which may then be detected by photosensitive means. A magnetic sound strip and magnetic pickup may also be used for the same purpose. Although the aural presentation in this system is derived from the associated magnetic tape storage device, it will be recognized that the sound to accompany motion picture sequences may also be provided from the visual display device 12.

The magnetic tape storage device 14 may, in accordance with certain features of the invention, be primarily an audio and not a digital system. The magnetic tape storage device 14 does, however, have a considerable number of storage tracks (eight in this example) with individual heads for each of the tracks, and means for using any selected one of the heads. The magnetic tape storage device 14 is also provided with means for driving the tape at fast rates in both the forward and reverse directions, in addition to a regular forward speed. The tape itself, a detailed example of which is given below, contains code groupings for each of the multiple tracks, these code groupings being arranged in blocks which are separately identified by conductive strips whose presence at a selected point is detected by an appropriate sliding contact arrangement. Those familiar with magnetic recording will recognize that the index mark function may also be provided by permanent or recorded magnetic patterns on a separate or identifiable track. More broadly speaking, like data processing functions may be provided in many other ways, although the use of selected frequency tones as in the present example permits particular economies to be achieved. The tape may be provided with a clock track, for example, by which the separate positions in the code groups may be located. Alternatively, the equivalent of a variable word length system may be used, with appropriate "word," "item" or "end of group" characters being recorded and recognized by conventional circuitry. The high capacity and low cost of the magnetic tape system is attractive, particularly where there is to be considerable aural presentation to the individual, but magnetic drums or disks or optically encoded strips might also be employed.

The various operative elements in the visual display device 12 are governed by signals from a visual display control unit 16 which operates in response to signals from the remainder of the system. A substantially similar tape control unit 18, described in detail below, is responsive to signals from the remainder of the system for controlling the functioning of the various elements in the magnetic tape storage device 14.

The remaining source of data for the system is a response signal generator 20, which is merely a control which is governed by button selections made by the individual who is working with the system. The button selections are made on a controllably lighted button panel 22 having an approximately arranged series or pattern of buttons. For different presentations, only certain ones of the buttons will be lighted in response to control signals, and the selection of one of these valid choices is returned to the control units of the system and also to an associated data recorder system 24. The recorder system 24 in this specific example provides a paper tape record of both the nature of the individual responses, and the time latency of the response relative to the completion of the presentation.

The control functions for the system are provided by a pre-response control unit 26, a post-response control unit 28 and a control unit selector 30. When a code group block is selected by the magnetic tape storage device 14 and its associated control 18, the control unit selector 30 conditions the pre-response control unit 26 to accept a selected number of successive code groups in a predetermined order. Dependent upon the coded program information, the pre-response control unit 26 then derives the successive signals from a part of the code group block for controlling different registers in accordance with different responses made by the individual operator. One signal is also applied to the controllably lighted button panel 22 to indicate valid choices which may be made by the individual operator. In addition, a control signal is provided to indicate that multiple item branching is to be undertaken. The pre-response control unit 26 also receives the appropriate response signal from the response signal generator 20, and, as determined by the previous programming signals, then selects one track for the derivation of post-response commands from the magnetic tape storage device 14.

The control unit selector 30 identifies the part of the code group block which serves as post-response programming, and controls the entry of the successive command sequences from the selected track into the post-response control unit 28. Control signals are provided for controlling the direction and the extent of movement of the visual display device 12, the direction and extent of movement of the magnetic tape storage device 14, the track in the magnetic tape storage device 14 which is to be used in the next sequence, and whether the next visual display sequence is to be of a single frame or of a continuous sequence of frames. After this program information is read from the magnetic tape storage device, the appropriate indications are provided to the tape control unit 18 and the visual display control unit 16, and the next sequence is then initiated.

While a selected address may be indicated directly in the program information and directly in coded form on the tape or film, it is preferred in this example to utilize differential addressing of the tape and film units. Counters in the visual display control unit 16 and the tape control unit 18 are thus set to locate addresses which are a specific number of places away from the address at which the system is then located. Upon counting the indicated number of places, the tape and film units are at the next desired locations. Certain further features which it might be convenient to employ but which are not necessary for the operation of the system have been omitted for simplicity. Among those which might be used, however, are arrangements for automatically slowing down the tape and film units as a selected address is approached, and automatic rewind mechanisms.

In very general terms, the operation of the system of FIGURE 1 may be described as involving a continuous interaction between the program information derived from the magnetic tape storage device 14, the responses provided by the individual via the response signal generator 20, and the alternative relationships established by the pre-response control unit 26 and the post-response control unit 28. Starting with a given track in a pre-response portion of a code group block, the system may then, depending upon program instructions and the student response, go to any of the tracks in the post-response section of the code group block for locating the commands for the next step in a sequence. Alternatively, however, the successive responses of the individual may be recorded in weighted relationship over a selected sequence. The weighted values thus made available at this "multiple item branch" point may then be used in a variety of ways. Comparisons of the weighted values to selected standard values are used in selecting the next post-response track for deriving instructions. In any case, the post-response track selects one of the different pre-response tracks for the next presentation.

The presentations which are successively made to a student may therefore vary from the projection of a single frame alone, to the timed projection of a sequence of single frames alone, to the presentation of the motion picture sequence alone, to the presentation of an aural message alone, or to any combination of aural and visual presentations which are desired. In the broad sense, therefore, there is opportunity by virtue of this versatility and capacity for the progressive development of an idea, for the progressive development of an idea by alternative sequences, for the insertion of remedial material, for the development of an entire sequence of remedial material, for the repetition of a part or all of an entire sequence, and for a definitive record of the behavior of the individual in response to a variety of known and controlled conditions.

Figure 2:
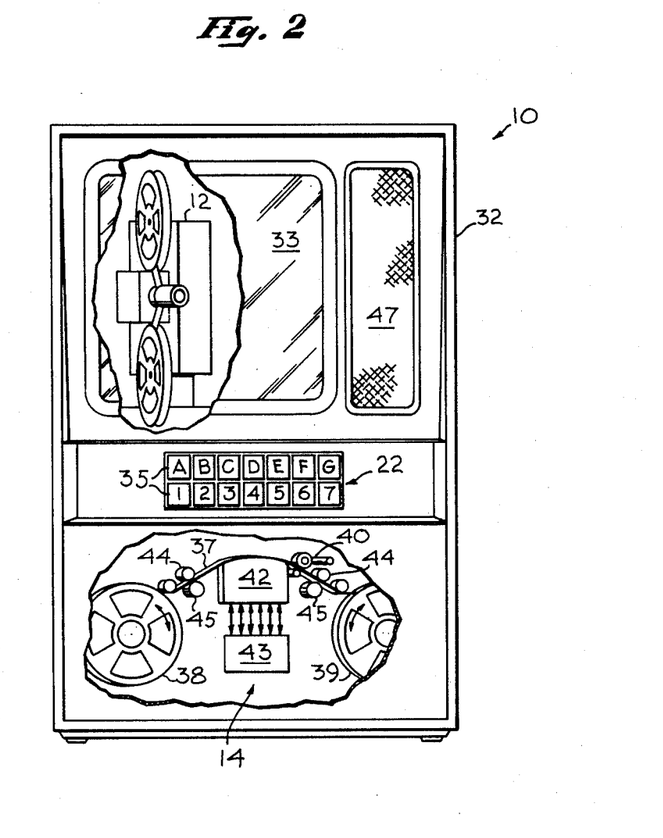
FIGURE 2 is a perspective view, partially broken away, of a typical presentation system which may be used in systems in accordance with the present invention.

The physical disposition of the elements employed in a system such as FIGURE 1 may be as shown in FIGURE 2. The entire unit may be housed in a console 32 having a ground glass screen 33. Translucent response buttons 35 mounted along the front of the console 32 have internal lights (not shown) which may be illuminated in different combinations at successive points in the program to indicate valid choices which may be selected by the individual operating the system. The visual display device 12, including the various control functions mentioned above, is positioned to provide a single frame or motion picture display on the ground glass screen 33. Preferably, in this example, a 16 millimeter projector is employed. Very little modification is required for most commercial quality projectors in this application.

The magnetic tape storage device 14 is essentially a commercially available tape deck with appropriate amplification equipment. The tape 37 is wound between a supply reel 38 and a takeup reel 39 which are controlled by associated drive motors which are not shown. For moderately rapid starting and stopping of the tape 37, magnetic braking of the motors which drive the reels 38, 39 is used. A stabilizing capstan 40 which engages a roller in the vicinity of the multi-head assembly 42 is used for assuring constant tape speed. It is not necessary in this application to utilize the more complex drive mechanisms in which extremely high densities are achieved and extremely short start and stop times are observed. Because the present system need only operate in conjunction with human observations and responses, it is preferred to utilize a less complex and therefore lower cost magnetic tape storage device 14 and to dispose the individual code segments further apart on the tape 37 and use wider block markers. If these precautions are observed, the tape 37 is started and stopped without danger of overlapping between separate parts of program information and without excessive strain being exerted on the tape, even though no compliance mechanisms are used.

Certain modifications are, however, made in the conventional tape deck. Inasmuch as eight recorded tracks are employed on the tape 37, a multi-head assembly 42 having a like number of pickup heads is also employed, and signals are derived from any selected one of the heads under control of a switching device 43 which is responsive to the track selection signals from the various control units. In order to sense the conductive segments on the tape 37, split idlers 45 are disposed adjacent the path of the tape 37 and are held in contact with the tape 37 by adjacent pinch rollers 44. Each split idler 45 consists of two conductive halves (not shown in detail) which are separated by a non-conductive spacer and which provide a complete circuit path only when both of the halves the split idler 45 are in contact with a conductive strip on the tape 37. A circuit coupled to the split idler thus indicates the passage of each successive one of the conductive strips.

The aural presentation to the student is made from appropriate acoustic transducers mounted in or coupled to the console 32. Here a loudspeaker 47 is mounted in a part of the console, although earphones may alternatively or additionally be used. The control units for the visual display device 12 of the magnetic tape storage device 14, and the control parts of the system as a whole, may be contained within the console 32 or mounted separately therefrom.

While ¼ inch tape may be suitable in some circumstances, with the use of eight separate tracks on the tape 37, it is preferred to utilize a wider tape, such as ½ inch or ⅝ inch tape.

Figure 3:
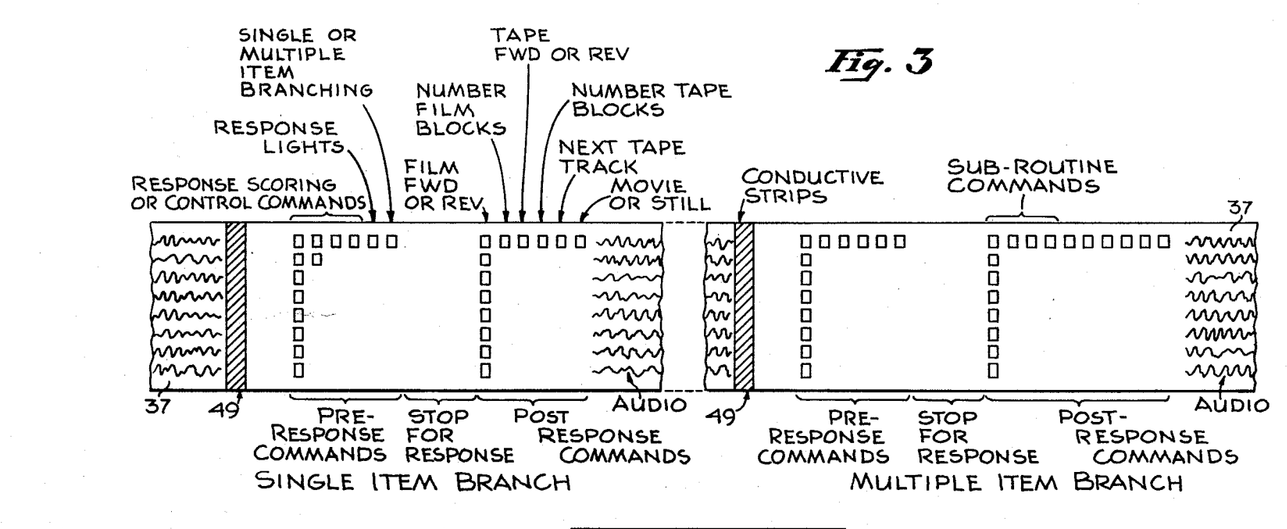
FIGURE 3 is an enlarged diagrammatic representation of the disposition of coded program information on a storage medium for use in systems in accordance with the invention.

The disposition of the various segments of the code group block used for programming and command functions is shown in enlarged and simplified form in FIGURE 3. The tape 37 moves from right to left, as viewed in FIGURE 3, past the associated head assembly (not shown). The code group block is thus preceded by a conductive strip 49 which extends transversely across the tape 37. Each of the successive commands in a track is utilized for a specific purpose or purposes. These purposes are indicated in general form in FIGURE 3. The commands in the various tracks may be divided into two principal groups, constituting pre-response commands and post-response commands. The pre-response and post-response commands are separated by a space in which the tape is held stationary until the individual operating the system provides an appropriate response.

Two different types of code group blocks are provided, in one of which the post-response commands consists of ten different commands, while in the other of which the post-response commands consist of six different commands. In each instance the pre-response commands consist of six different commands, as shown. The four additional commands which may be used in the post-response portion are employed in separate sub-routines which are utilized when multiple item branching is to be undertaken. The tape also includes lengths of audio recordings disposed subsequent to the command portions. The audio recordings, however, are associated with the commands in the succeeding block of information, for reasons which will become more evident hereafter.

Figure 4:
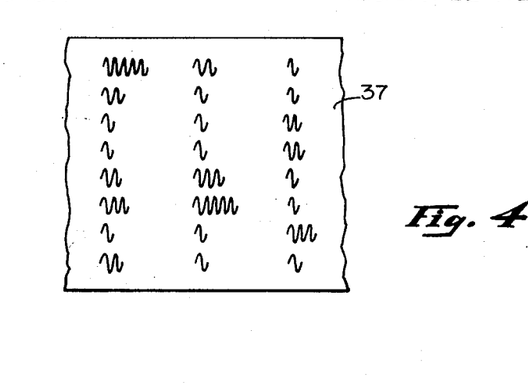
FIGURE 4 is an enlarged view of a fragment of the storage medium of FIGURE 3, showing in idealized form the manner in which program information may be encoded thereon.

Effective use is made of a conventional low-cost tape deck system by providing the commands in the form of sinusoidally varying record patterns on the tape 37. As shown in FIGURE 4, in which the sinusoidal recorded pattern variation is represented in idealized form by a corresponding waveform, different commands are represented by different numbers of cycles in the waveform. These cyclical variations are utilized to set up digital valued code combinations which represent program information.

The arrangements of FIGURES 5 through 9 provide specific examples of different units which may be employed in a system such as FIGURE 1. In FIGURE 5 there is shown a control unit selector which may be utilized as the selector 30. This unit is responsive to the coded signals of selected frequency from the tape, it being assumed that these signals are of sufficiently high frequency level to be outside the audio range, although the system may be arranged to switch off the loudspeaker or headset except when an aural presentation is being made. The program information is applied first to an envelope detector circuit 50 which is used merely to provide a rectangular waveform which demarcates the leading and trailing edges of the sinusoidal wave segments which constitute command information. This command information is concurrently provided to a group of decoders 52 which are here labeled as the C1 to C13 decoders 52. These decoders 52 serve as gates which are responsive to different combinations of signals from a "C" counter-register 53 and to single item branch signals. The counter-register 53 has at least thirteen different states, the exact number depending on the manner in which it is used. The "C" counter-register 53 and the decoders 52 in effect gate out command pulse sequences C1 to C13 on different output terminals as the command information is read from the tape. Each command pulse sequence is rectified because of the operation of the decoders 52, and thus converted to a number of pulses corresponding to the number of cycles recorded on the tape. The "C" counter-register 53 may also be set to the C3 state at certain instances, on concurrence of a multiple item branch signal and a response, by counter control gates 54.

In operation of the "C" counter-register 53, the trailing edges of the rectangular waveforms from the envelope detector 50 are caused to actuate a pulse generator 57 to generate pulses of relatively brief duration but well defined waveform. The pulse generator, for example, may be a monostable multivibrator. The pulse shapes provided by the pulse generator 57 therefore mark the trailing edges of the successive command signals derived from the tape, and these pulses are effectively counted by the "C" counter-register 53. The counter-register 53 also receives signals provided from the response signal generator 20 of FIGURE 1, through an "or" gate 58 to which the pulse generator 57 is also coupled. The "C" counter-register 53 is reset to its initial state on going through a complete cycle, as by using the final pulse following the gating of signals through the C13 decoder 52. Amplifiers and pulse shaping circuitry which may be employed with this arrangement have been omitted for simplicity.

The function of the control unit selector of FIGURE 5 therefore consists of the successive provision, on the output terminals of the decoders 52, of the command pulse sequences. The first through sixth command pulse sequences C1 to C6 are provided to the pre-response control unit of FIGURE 6. C7 is used as a hold signal to stop the forward motion of the tape until a response is received from the response signal generator 20 of FIGURE 1 because of selection of a valid choice by the individual. Thereafter, the C8 to C13 command pulse sequences are directed to the post-response control unit which is shown in detail in FIGURE 7. The "C" counter-register 53 may also be reset to the C3 state.

In the pre-response control unit 26 of FIGURE 1, referring now to FIGURE 6, there are employed six counter-registers 60, designated respectively as the C1 through C6 counter registers. Each of these counter-registers 60 may be set to a selected count determined by a command pulse sequence C1 through C6, and all are reset concurrently by reset signals, such as those used to reset the "C" counter-register 53 of FIGURE 5, or the block signals derived from the conductive strips on the tape. The number of stages which are used in the counter-registers 60 determine, in accordance with well established data processing techniques in the design of decoding equipment, the number of choices which the command pules sequences may control. The C1 to C4 counter-registers 60 are utilized for the control of track selection in accordance with a response made by an individual following a presentation, in the case of single item branching, and to control the entry of weighted response values in scoring registers in the post-response control unit where multiple item branching is employed. For this purpose, a decoder circuit 62 is coupled to be controlled by the output signal paterns presented by the C1 to C4 counter-registers 60, as conditioned by the "single item branch" and "multiple item branch" signals, and as finally determined by responses made by the individual operating the system. As stated above, the amount of circuitry employed is dependent upon the number of alternative choices which it is desired to have, but the circuitry may employ any of a number of well recognized expedients. Accordingly, it has not been described in detail, although it should be recognized that the term "decoder" is intended to cover a wide variety of code conversion networks, logical gating circuits and decision networks. Relatively few choices are needed to select one of the eight tracks of the magnetic tape storage device, for example, if only three selections are offered to the individual. The decision making process is still relatively simple even if eight or ten choices are offered to the individual. In multiple item branching, however, each response elicited from the individual may be entered in a different scoring register in succession, and represented as a certain weighted value. Even with as few as four stages in each of the C1 to C4 counter-registers 60, however, there are the equivalent of sixteen binary places available for decision. This provides sufficient memory for the control of a number of complex programming sequences. More may, of course, be used.

The function of the C1 to C4 counter-register portion of the pre-response control unit, in conjunction with decoder circuit 62 is therefore twofold. On single item branching, responses are used to control track selection. On multiple item branching, weighted values determined by successive responses are transmited to the post-response control unit. The weighted values are, in effect, commutated to different scoring registers, so that a commutator or shift register type of device may be employed for this purpose. It will also be recognized by those skilled in the art that the counter-registers 60 may each contribute to an interrelated control of the decoder circuit 62, or each of the counter-registers 60 may control the application of the weighted values to an associated scoring register.

The C5 counter-register 60 is utilized, in conjunction with a decoder 63, to provide signals on a number of terminals to control the lights in the button panel 22 of FIGURE 1. Here the function is to convert a binary or decimal representation into a representation in which different ones of a number of possible choices may be concurrently activated.

The C6 counter-register 60 is coupled to a different decoder 64 to provide either one of two signals in response to appropriate command pulse sequences. These signals are the "single item branch" and "multiple item branch" signals.

Figure 7:
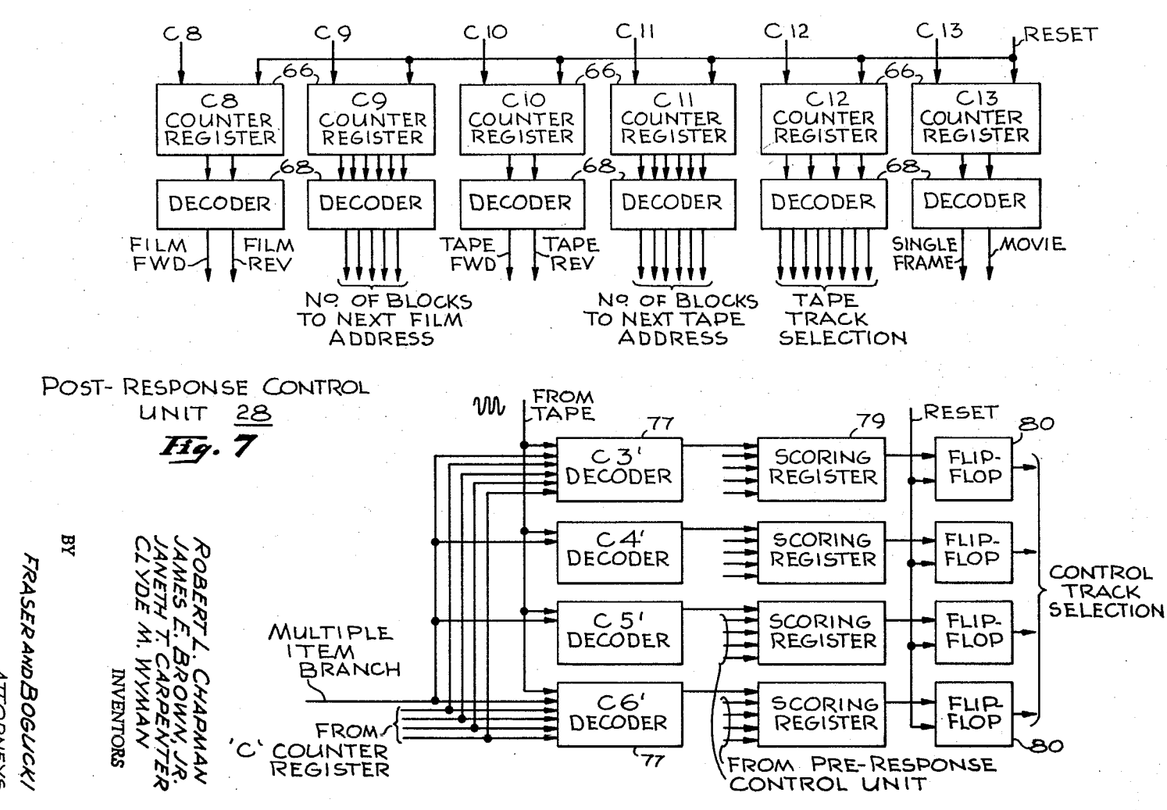
FIGURE 7 is a block diagram representation of a unit for providing a post-response control function in the system of FIGURE 1.

A porion of the post-response control unit of FIGURE 7 corresponds generally to the counter-registers and decoders just discussed in conjunction with FIGURE 6. Six counter-registers 66, designated the C8 to C13 counter-registers 66 respectively, are each arranged to receive command pulse sequences C8 through C13 and to be reset concurrently. Each of the counter-registers is coupled to an associated decoder circuit 68 which generates signals for controlling a different function in the system. The C8 and the C10 counter-registers 66 require only relatively few stages, because there registers are concerned with the functions of providing film forward and film reverse signals and tape forward and tape reverse signals respectively. The C9 and C11 counter-registers 66 indicate the number of blocks to be traversed by the film and tape mechanisms respectively in locating the next address to be used in the sequence. Decoders 68 may or may not be needed with these two counter-registers, depending upon the arrangement of the associated circuitry. The C12 counter-register 66 contains sufficient binary stages for selecting, in conjunction with an associated decoder 68, the tape track to be used in the next sequence. The C13 counter-register 66 requires only two stages, inasmuch as it selects between the single frame and movie controls of the visual display device 12 of FIGURE 1.

The signals derived from the C8, C9 and C13 counter-registers 66 are applied to the visual display control unit 16 of FIGURE 1. The signals derived from the C10, C11 and C12 counter-registers 66 are applied to the tape control unit 18 of FIGURE 1.

The remainder of the post-response control unit 28 is utilized to govern the operation of principal parts of the system in the performance of the multiple item branch sub-routine. The sub-routine is initiated on concurrent provision of the multiple item branch signal and a response signal to the circuits of FIGURES 5 and 7. On resetting of the "C" counter-register 53 (FIGURE 5) to the C3 state, a sub-routine is undertaken which utilizes the succeeding four states, here called the C3' to C6' states. Corresponding decoders 77 in FIGURE 7 are activated during this sub-routine by the states of the "C" counter-register 53 and the multiple item branch signal.

The decoders 77 are coupled to the counter inputs of different scoring registers 79, each of which is coupled to the arrangement of FIGURE 6 so as to be set with a different weighted value determined by a succession of responses given prior to undertaking the multiple item branch sub-routine. The scoring registers 79 are arranged to provide a comparison of the weighted values with command information derived from the tape. This comparison is effected by a counting operation as follows. The command values which are stored on the tape are in command pulse sequences which represent the complement, to a base determined by the number of stages in the scoring register 79, of a selected value. These complement values, upon being applied to a scoring register 79, drive the content of the scoring register 79 forward toward its highest value at which it will provide a final carry pulse and begin to recycle. If the weighted value stored in a scoring register 79 was initially in excess of or equal to the value whose complement was stored as a command signal on the tape, the carry signal results. The carry signal accordingly indicates that the value stored in the scoring register was equal to or greater than the selected standard. Each of the scoring registers is coupled to provide a signal suitable for controlling track selection in the remainder of the post-response sequenc following the sub-routine. For proper timing, each of the signals from the scoring register 79 is applied to set a different flip-flop 80 which may subsequently be reset during the remainder of the post-response readout. Here again it should be recognized that if interrelated values are used instead of a succession of weighted values, the track which is selected may be chosen on the basis of all of the scoring values and not merely on the basis of the relationship of one scoring to a standard value.

Figures 8, 9:
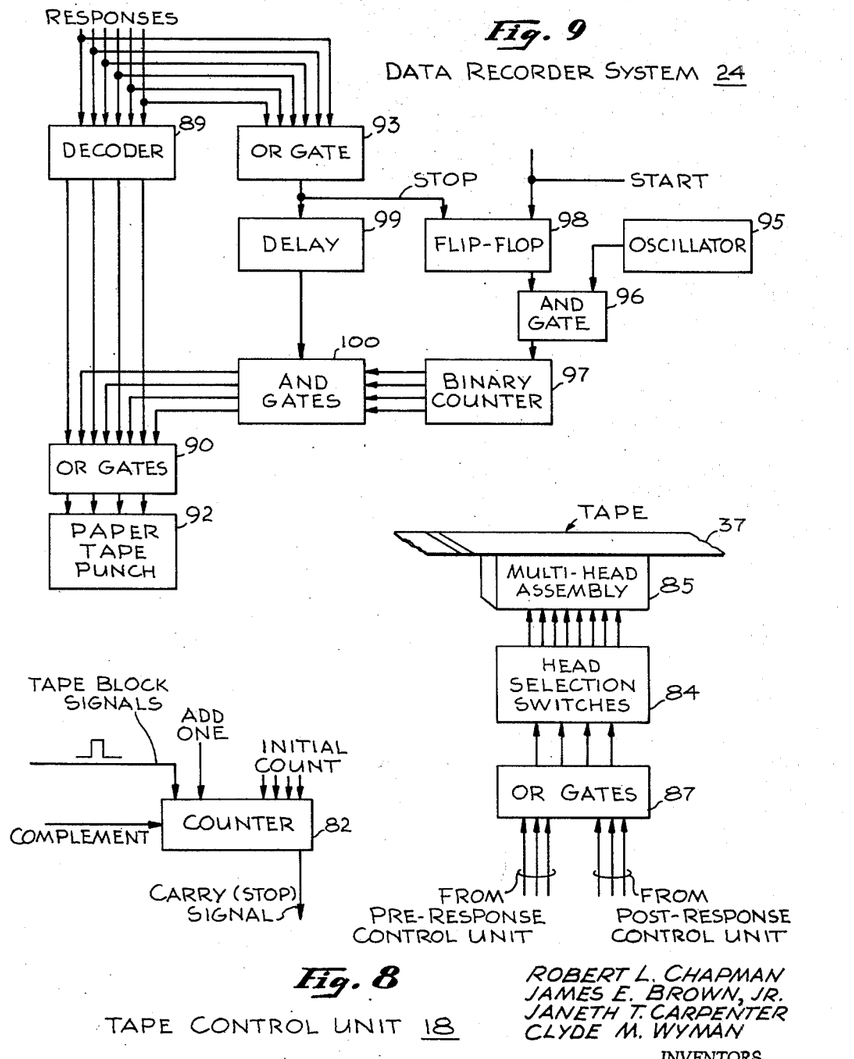
FIGURE 8 is a block diagram representation of a unit for controlling the operation of a magnetic tape storage device such as is shown in FIGURES 1 and 2.
FIGURE 9 is a block diagram representation of a data recorder system which may be employed in the arrangement of FIGURE 1.

The tape control unit for selecting an address and a track on the magnetic tape storage device 14 of FIGURE 1 may be arranged as shown in FIGURE 8. Address location may be controlled readily by a binary counter 82 which is coupled to receive the address information from the post-response control unit. For simplicity herein, the counter 82 is described as a separate unit which is set by the address information originally stored in the C11 counter-register 66 of FIGURE 7. With proper provision made in the input terminals of the stages of the counter 82, however, these functions may actually be provided by a single counter. It is required that the counter 82 have an input terminal to which complement pulses may be applied to invert the state of each of the stages of the counter 82. Furthermore, the counter 82 should be coupled to receive tape block signals as well as the command signals from the tape, and a signal which will add one to the count following the insertion of the complement, in order to provide a carry at the proper count. Once this is done, however, a signal is correctly provided by this simple mechanism once the proper tape address is reached. After being set with the proper count, either directly from the command pulse sequence or by the count provided by the C11 counter-register 66 of FIGURE 7, the value stored in the counter 82 is complemented by reversing each stage and a one is then added. The tape block signals are then coupled in from the split idler circuit at the tape mechanism as each code group block is passed. When the counter 82 provides the carry signal on passing its highest value, this carry signal may be used as a stop signal for the tape control mechanism.

Conventional head selection switches 84 may be utilized to couple signals from any one of the heads in a multi-head assembly 85 to the remainder of the system. Inasmuch as track selection signals are provided by the pre-response control unit of FIGURE 6 and the post-response control unit of FIGURE 7 under different circumstances, the head selection switches 84 may receive signals from each of these units through "or" gates 87.

The data recorder system 24 of FIGURE 1 may assume a number of different forms, one of which is shown in FIGURE 9. Response signals on any one of the lines from the response signal generator 20 (FIGURE 1) may be applied to a decoder 89 for conversion to a suitable binary code. Signals from the decoder 89 may be applied through "or" gates 90 to actuate a paper tape punch 92. Concurrently, a signal from any one or more of the output terminals of the decoder 89 may provide a signal through an "or" gate 93 which is coupled to provide stop signals to a timer system. Commercially available timer systems of this nature generally include a crystal controlled or other closely regulated oscillator 95 providing signals through an "and" gate 96 to a binary counter 97. The "and" gate 96 is conditioned to pass signals from the oscillator 95 to be counted by the counter 97 only when an associated flip-flop 98 is set by start signals. Here the start signals for the system may be the C7 or hold signals from the control unit selector 30 which will be provided at approximately the time the choices are indicated to the individual. The signals which stop the count then are those generated upon a response choice being made by the individual.

The time latency of the response may be entered by the paper tape punch 92 by using the response signal itself after sufficient retardation in a delay circuit 99, following which an "and" gate 100 coupled to the output terminals of the binary counter 97 applies the count presented by the counter to the paper tape punch 92 through the "or" gates 90. Thereafter, as by the use of a block signal or one of the pulse signals, the binary counter 97 may be reset and the system may await a new presentation and response.

In the operation of the system, referring generally to FIGURE 1 and specifically to other figures to be designated hereafter, responses by an individual or student may be caused to select the next step in a sequence on the basis of either a single response or a succession of responses. The use of single responses to control the sequence is what is referred to as single item branching, while the use of a succession of responses is what is referred to as multiple item branching. An example of the operation of the system under single item branching conditions will be described first.

The system may, of course, be started with the magnetic tape storage device 14 (FIGURES 1 and 2) so positioned that any selected code group block, as shown in FIGURE 3, is in position to be read by the head assembly. Usually, the start will be made at a block (not shown in FIGURE 3) prepared for the start of a sequence, and including introductory material which may provide selected limited choices for the subsequent presentation. Within the presentation and command information arranged as shown, the system locates the code group block which precedes the code group block containing the desired command portions. The audio recording which precedes given command information is thus separated from the command information by the block marker. Command information in the same code group block as the audio recording is here assumed to instruct the system merely to proceed to derive commands from the next code group block, following the presentation of aural and visual information as desired. Then, when the aural information has been reproduced, the conductive strip 49 on the tape is sensed by the split idler 45 and the block signal is derived to initiate the reading of commands.

It will be recognized that other arrangements may be used, depending on whether it is useful or convenient to arrange the audio differently, to enter the commands differently, or to utilize switching techniques to skip the first code group block commands while utilizing the audio.

The block signal passes (referring now to FIG. 5) through the "or" gate 58 to the counting input of the "C" counter-register 53, to set that device into its first active (C1) state. In the C1 state, the C1 decoder 52 passes a sequence of pulses from the first cyclic command waveform on the tape. The rectified output signals which appear as a series of a specified number of pulses on the output terminal of the C1 decoder 52 are coupled to the counting input of the C1 counter-register 60 of the pre-response control unit 26 of FIGURE 6. This count is therefore stored and presented until after a response is received from the individual who is operating the system.

At the termination of each cyclic waveform derived from the tape, the envelope detector 50 (FIGURE 5) provides a negative-going trailing edge to trigger the pulse generator 57 to provide a pulse to be counted by the "C" counter-register 53, thus shifting this unit to its next state, in which the C2 decoder 52 is conditioned to pass the waveform derived from the tape. As the second of the pre-response commands is read off, therefore, it is entered into the C2 counter-register 60 of FIGURE 6 and presented to the decoder circuit 62. The sequence continues in this fashion, until all of the pre-response commands C1 to C6 inclusive have been entered into their respective counter-registers 60.

In single item branching, the significance of the code presentation made from the C1 to C4 counter-registers 60 to the decoders 62 is as follows. Any response from the student or individual operator will result in a predetermined signal from the decoder circuit 62. This predetermined signal is the track selection control signal which is applied back to the tape control unit of FIGURES 1 and 8. It will be noted that in the button panel assembly of FIGURE 2 there are seven alphabetic and seven numeric choices available. This gives the possibility of forty-nine different combinations if single alphabetic and numeric traces must be made in combination, and many more possibilities if other combinations can be employed. In single item branching, however, there are only eight different tracks and so only eight different selection indications to be made. Thus if many more choices are available to the student a number of the choices will be arranged to have like significance. If desirable, however, many more tracks may be utilized on the tape. It will be noted that the problem of directing a response through the decoder circuit 62 to provide a given track selection signal is considerably simplified by virtue of the fact that the controlling code signals provided from the C1 to C4 counter-registers 60 may be varied at will.

During the pre-response command interval also, the C5 counter-register 60 sets the associated decoder 63 to provide signals which light a selected combination of lights in the buttons 35 (FIGURE 2), as represented by the controllably lighted button panel 22 of FIGURE 1. Thereafter, the C6 counter-register 60 sets its associated decoder 64 to provide, in this instance, the single item branch signal to the decoder circuit 62. It should be noted that the single item branch signal is provided prior to any response which may be caused to actuate the decoder circuit 62 so as to provide a track selection control signal.

At the end of the pre-response command interval, therefore, the six successive commands have been entered by the system and the student is offered a choice of responses. Note here that the aural and visual presentation was undertaken under control of the previous code group block. These presentations are arranged to terminate in a desired time relation prior to the initiation of the pre-response commands. A start signal is applied to the flip-flop 98 in the decoder system of FIGURE 9 coincident with the presentation of choices to the individual. The flip-flop 98 conditions the associated "and" gate 96 so that the precisely time-controlled pulses from the oscillator 95 begin to accumulate a count in the binary counter 97.

Thereafter, the student may make any valid choice he desires out of the valid choices indicated to him on the lighted buttons 35 of the controllably lighted button panel 22 (FIGURES 1 and 2). When the response is received, the post-response command sequence is undertaken by reading from the selected track determined by the response. At the end of the pre-response command interval the "C" counter-register 53 (FIGURE 5) has been set in the state in which the C7 decoder 52 provides the hold signal in which a response is awaited. The response itself passes through the "or" gate 58 to trigger the "C" counter-register 53 into the C8 state, so that the next command pulse sequence passes through the C8 decoder 52. Succeeding command pulse sequences pass through the C9 to C13 decoders 52 in the manner previously described in conjunction with the pre-response commands. The C8 to C13 or post-response commands are successively entered as pulse sequences in the C8 to C13 counter-registers 66 in the post-response control unit 28 of FIGURE 7. Various commands are again made available for actuating the tape control unit 18 and the visual display control unit 16 upon completion of the post-response command interval. Gates or switching arrangements may be used for proper timing application of these signals following the post-response command sequence.

The C8 command merely selects betwen the film forward and film reverse directions, so that the associated decoder 68 need only provide two different correspondingly designated signals. The C9 command is determined by the programmer so as to select the number of blocks to the next film address, the decoder 68 which is used for this purpose setting up a counter in the visual display control unit 16 of FIGURE 1. The count provided from the C10 counter-register 66 controls tape forward and tape reverse directions through the decoder 68, while the C11 counter-register 66 results in the provision of a signal representing the number of blocks to the next tape address. Together with this, the C12 and C13 commands control the tape track selection for the aural and next pre-response command sequences, and single frame or movie visual displays. Switching to the next tape track may be begun immediately upon completion of the C13 post-response command.

In accordance with the C8 to C13 commands, the next aural presentation is derived from a selected track on the tape storage device 14 after the tape control unit 18 of FIGURE 8 locates the next tape blocks to be used. It will be recalled that initial positioning is at a selected code group block containing the desired audio, which is then read out. Concurrently, the visual display control unit 16 moves the film forward or reverse at a high speed to locate the next visual presentation, which may be a single frame or a motion picture display to be coordinated with the aural presentation. The addressing circuits for both the visual display control unit 16 and the tape control unit 18 may be similar, so that only the tape control unit 18 will be described.

Referring now to the tape control unit of FIGURE 8, once the initial count which determines the number of blocks to the next address is set into the counter 82, this count is complemented by an application of an appropriate pulse to the complement input terminal of the counter 82. Then, an additional input signal is provided to advance the count of the counter by one. The counter 82 is therefore set to provide a carry signal whenever a number of tape block signals equal to the original count or address have been received from the conductive strips on the tape. The carry signal is used to stop the high speed movement, so that the regular forward speed may commence and the command information may be read into the various control units. This then constitutes location of the next desired code group block in the sequence, following which the audio information is read out, the conductive block marker is sensed, and the subsequent pre-response commands are read so that further choices are presented to the student and this subsequent response determines the next sequence to be employed.

Multiple items branching utilizes the previously mentioned sub-routine commands within the post-response commands, as shown at the right hand side of the tape 37 illustrated in FIGURE 3. The pre-response commands are substantially the same as previously described in conjunction with single item branching. In the pre-response control unit 26 of FIGURE 6, however, the counter-registers 60 which are coupled to the decoder circuit 62 set up a different coding, to establish both the scoring registers into which successive responses are to be put, and the weighted value to be assigned to different ones of the responses. In a succession of code group blocks used in multiple item branching, the first code group will determine that the first response is set into a first scoring register 79 of FIGURE 7, the second response is set into the second scoring register 79, and so on. If multiple item branching is to be undertaken after four successive responses, as here, four successive weighted values are set into the four scoring registers 79 which are shown. The number of scoring registers 79 is of course merely a matter of choice, as is the number of sub-routine commands which may be employed.

Multiple item branch points may be programmed on the tape in a number of different ways. They may follow the last in a series of responses, or follow a sequence of remedial material inserted after a previous branch point. The system may, for example, go through a series of presentations in which successive weighted values are accumulated in the scoring registers 79. During these presentations, the pre-response commands cause the responses to pass weighted values from the decoder circuit 62 (FIGURE 6) into the scoring registers 79 (FIGURE 7). The post-response commands are used during this time to control passage to the next steps in the sequence. When, in accordance with this example, the last of the multiple items has been entered, the multiple item branch is indicated. Once this indication is made in the sequence, the control unit selector 30 of FIGURE 5 and the post-response control unit 28 of FIGURE 7 are set to read off the four sub-routine commands and then the remaining six commands in the post-response group in the code group block which is then at the head assembly.

As previously described in conjunction with FIGURES 5 and 7, the concurrent existence of the multiple item branch and response signals set the counter control gates 54 (FIGURE 5) so that the "C" counter-register 53 is reset to the C3 state. In the multiple item branch subroutine, signals are passed in sequence through the successive C3' to C6' decoders 77 of FIGURE 7. The weighted values derived from the successive responses were previously entered into the scoring registers 79, and it is now required to compare these weighted values to selected standard values derived from the four subroutine commands on the tape. With a first of the subroutine commands, the "C" counter-register 53 conditions the C3' decoder 77 to receive the command pulse sequences, which are then applied to the associated scoring register 79 to advance the count therein. Now as stated above, the count contained in the sub-routine command is actually the complement, to a numerical base selected for the scoring register 79, of a selected standard value. If the weighted value contained in the scoring register 79 is in excess of the selected standard value whose complement is applied, the scoring register 79 provides an output signal to set the associated flip-flop 80. Thus the system indicates that the first response made by the student had a sufficiently weighted value to exceed a certain standard, and this determines the next track to be utilized in deriving the post-response commands. If, however, the weighted value in the scoring register 79 is not sufficiently high, the system may proceed to the next of the scoring registers, to compare the next standard value derived from the sub-routine commands to the next weighted response value. Whichever weighted value relationship exists under the given response conditions determines the next sequence by a selection of the appropriate series of six further post-response commands.

Whether single item or multiple item branching is employed, the successive responses, as well as their time latency, are recorded in the data recorder system 24. Each time a response is made, it is converted to a binary form in the decoder 89 and entered into the tape punch 92. The delayed representation of the response is used to control the entry, through the "and" gates 100, of the accumulated count in the binary counter 97. It will be appreciated that as the system proceeds through single item branching and multiple item branching steps a pattern which is extremely informative as to the intelligence and temperament of a student will be represented in the record established by the data recorder system 24.

Multiple item branching may be used in a number of other ways, as will be apparent. The stored weighted values may represent one of more correct answers, incorrect answers, or meaningful partially correct answers. Each of these answers or answer patterns may be used in an advantageous fashion. After a first comparison, for example, a sequence of remedial or supplementary material may be inserted. Then the system may return to the other weighted values to carry on with the basic sequence.

An example of how the system capabilities may be employed is found in the problem of imparting the different elements of a concept. The successive responses made by a student may be scored so as to represent successive levels of comprehension. Then, on testing, appropriate reading material may be inserted if needed, before proceeding to testing at the next level of comprehension.

In another context, the system may impart a generalization and test for the ability to apply the generalization. Here, responses may be scored differentially but taken together for comparison. Thus decisions may be made on the basis of unbroken sequences of right answers, or on a percentage of correct answers out of a total. Two or more correct answers in a row, for example, may determine that the remainder of a sequence can be skipped.

The ability to skip material is present in both multiple item branching and single item branching. If responses reveal that information is being assimilated with ease, certain portions of instructional material may be omitted. Conversely, the ability to score and retain responses permits additional instructional material to be used if a high error rate is encountered.

Although the system has primarily been described in terms of a tutorial device by way of example, it will be appreciated that it is actually an instrument of far greater versatility. The capacity for selection of successive presentations is such that the machine may also be used for sales and promotional work, as well as in production processes. A prospective customer may go through the selections which are available to him and utilize the aural and visual presentations to derive, rapidly and clearly, particular information which he may desire. In production installations, the machine may be utilized to describe, always in needed detail, successive steps which are used in the fabrication or assembly of a product.

The capacity of the system for responding to different choices and for recording different information may perhaps be best visualized as a scientific instrument for behavioral examination when used with a group of persons. When so used, the responses made by the individuals may be taken together in controlling the next step in a sequence, or the sequence may be fixed and the individual responses may be separately recorded, or these two techniques may be combined.

At all times, the system can utilize the performance of individuals to control presentation. This, according to modern techniques, is then converted to the maintenance of optimum learning conditions for the individual student. Considerable advantage is also derived from the fact that the presentations may be fashioned so as to gain and hold the interest of the student. The versatility of the system is such that, at each phase, most effective techniques may be utilized for querying the student, and the most effective remedial information may be made available to him. A number of readily available alternatives have not been shown in detail in order to simplify the discussion. Some of these may, however, be mentioned inasmuch as they are to be considered as falling within the concept of the invention. With the type of system described, capacity may be increased by utilizing concurrent recording of different frequencies in the command signals. These different frequencies may then be segregated after reproduction by appropriate filters. A special command may be incorporated in the C6 counter-register 60 of FIGURE 6 to control the presentation of a succession of single frame displays from the projector. The system may also be arranged to provide an appropriate indication whenever the student's performance is such as to indicate excessive confusion or insufficient comprehension. The system may be arranged to repeat the same material, for example, through arrangement of the pre-response and post-response commands, when certain responses are made. If the same material is repeated more than a selected minimum number of times, the need for an instructor may be indicated.

The time needed for a response may also be used for control purposes. The student may be prepared by the oral instructions to identify a visual phenomena which is about to be shown. The time latency of the response is provided in digital form and is directly usable as a weighted value. Very slow responses, even though correct, may also be used to introduce appropriate supplemental or instructional material.

While a number of alternatives and modifications have been discussed or suggested, it will be appreciated that the invention is not limited thereto, but may embrace a wide variety of forms. Accordingly, the invention should be considered to include all alternative systems and individual arrangements falling within the scope of the appended claims.

What is claimed is:

1. A tutoring machine including means for providing a multiplicity of selectable information presentations in sequence, means for producing individual responses from an individual operator at successive points in a sequence of presentations, means providing standard values, means for storing weighted value representations of the individual responses, means for comparing the weighted value representations to selected standard values, and means responsive to the comparison results for selecting another information presentation, from the multiplicity of presentations, in accordance therewith.

2. A tutoring machine including means for providing a multiplicity of selectable information presentations, addressable command means, means for producing individual responses from an individual operator during a sequence of presentations, means providing standard values, means for storing weighted value representations corresponding to information derived from the individual responses, means for individually comparing the weighted value representations to selected standard values, and means responsive to the comparison results for selecting an address of the addressable command means, the command means being coupled to control a succeeding information presentation in accordance therewith.

3. A tutoring machine including information storage means for providing a multiplicity of selectable sequential information presentations, the storage means also including a number of command sequences arranged in parallel groupings associated with the different information presentations, means responsive to the command sequences for providing valid choice representations to an individual, means responsive to choices selected by an individual and to the command sequences for generating weighted value representations, means for successively storing the weighted value representations, and means responsive to the weighted value representations and successive command sequences from the storage device for selecting further command sequences in the information storage means.

4. A tutorial device for providing controlled sequences of presentations providing successive and remedial information as needed in accordance with the responses of a student, including information presentation means having indexed blocks of information and being controllable to address selected blocks, a multi-track storage device bearing prepared command information arranged in code group blocks having pre-response and post-response portions, means for deriving command information from the pre-response portion of a selected block on a selected track of the storage device, means controlled by the command information of the pre-response portions for alternatively selecting the post-response portion of a selected block on a selected track in response to (1) a single response or (2) a succession of responses, and means responsive to the selected post-response portions of the code group blocks for controlling the information presentation means.

5. A tutorial device for providing controlled sequences of presentations of successively developed and remedial information as needed in accordance with the responses of a student, including visual and aural presentation means, each of the visual and aural presentation means having indexed blocks of information and being controllable to address selected blocks, the aural presentation means also including a number of parallel command tracks bearing prepared command information arranged in code group blocks having pre-response and post-response portions, the pre-response portions including command information providing selected choices to a student, means for receiving responses of a student and command information from the pre-response portion of a selected block on a selected track, means responsive to the command information from the pre-response portion and to the student responses for alternatively selecting the post-response portion of a selected block on a selected track in response to (1) a single response or (2) weighted values of a succession of responses, and means responsive to the selected post-response portion of a selected block on a selected track for controlling the addressing of the visual and aural presentation means.

6. A tutorial device including addressable information presentation means, the information presentation means including command information disposed in groupings associated with information sequences, means responsive to the command information for providing selections to a student, means responsive to the command information and to the selections of a student for selecting further command information in response to (1) a single response or (2) representations of a succession of responses, and means responsive to the selected command information for controlling the addressing of the information presentation means.

7. A tutorial device for providing a sequence of presentations controlled by responses from an individual including means for presenting information for response by an individual, multi-track storage means for providing different command information associated with each presentation, means responsive to the command information and to responses from an individual for selecting a track for succeeding command information, and means responsive to the selected succeeding command information for providing a subsequent presentation.

8. A behavioral observation instrument including a storage device having multiple parallel tracks, each of the parallel tracks including presentation information and command information divided into commands for the control of scoring of responses and commands for the control of sequences, means coupled to the storage device for controlling the selection of individual tracks, means responsive to the information for the scoring of responses for providing choices for a student, means responsive to the commands controlling the scoring of responses, and to responses themselves for providing weighted value representations of a succession of responses, and means responsive to the commands for the control of sequences and to the weighted value representations for controlling further track selection.

9. A device for providing controllable sequences of presentations determined in accordance with responses of an individual, including addressable information presentation means having indexed blocks of information and being controllable to address selected blocks, an addressable multi-track storage device bearing prepared command information arranged in code group blocks having pre-response and post-response portions, means for deriving command information from the pre-response portion of a selected block on a selected track, means responsive to the pre-response portion of a block and to response information for selecting a track for post-response command information, and means responsive to the post-response command information for controlling the addressing of the information presentation means and the multi-track storage device to selected blocks, and for selecting a track of the storage device for command information from a pre-response portion.

10. A device for providing controllable sequences of presentations determined in accordance with responses of an individual, including visual and aural presentation means, each of the visual and aural presentation means having indexed blocks of information and being controllable to address selected blocks, the aural presentation means also including a number of parallel command tracks bearing prepared command information arranged in code group blocks having pre-response and post-response portions, the pre-response portions including command information providing selected choices to a student, means responsive to responses of a student and command information for selecting command information from the pre-response portion of a selected block on a selected track, means responsive to the command information from the pre-response portion and to the response information for selecting one of the tracks for deriving post-response commands, and means responsive to the selected post-response commands for controlling the addressing of the visual and aural presentation means.

11. A program control for a tutorial system including a storage medium having a plurality of recorded tracks, the recorded tracks being in the form of recorded sequences representing cyclic waveforms, each sequence having a number of cycles representing different command information, different sequences being disposed at like transverse positions relative to the tracks, the sequences being arranged in blocks along the tracks, means coupled to the storage medium for deriving the command information including a plurality of means for counting cycles in the sequences, and means for selecting the individual counting means to receive the sequences.

12. A program control for a tutorial device for providing digital information for controlling operative sequences and including the combination of a storage medium having a plurality of recorded tracks, the recorded tracks including segments consisting of continuous cyclic variations, the number of cycles of which represent a given command, the segments being disposed in given transverse positions across the tracks, means coupled to the storage medium for reading out the signal variations on individual selected tracks, means responsive to the signal variations for identifying the termination of individual segments, means responsive to the identification of the termination of the segments for providing different control states, and a plurality of counter-register means responsive to the different control states and to the signals which are read out from the storage medium for counting the cycles of the segments.

13. A tutoring machine including storage means for presenting information to a student, the storage means including indexed command information segments associated with information segments to be presented, controllable means coupled to the storage means for addressing the storage means to derive command information signals therefrom, means responsive to the command information signals and to choices selected by an individual for selectively storing weighted values representative of scored responses, and means responsive to the weighted values and to command information for selectively controlling the means for addressing the storage means while retaining the weighted values.

14. A tutorial device for operating in accordance with the needs of a student as determined by response of the student, including a storage system including means for presenting information for producing responses and having multiple parallel tracks containing command information arranged as cyclic waveforms having selected numbers of cycles, means for addressing selected tracks of the storage system, and counter-register means responsive to the number of cycles represented by the selected command information and to responses of a student for controlling the means for addressing the storage system.

15. A tutorial device for operating in accordance with the needs of a student as determined by the response of the student, including the combination of a storage device having multiple parallel tracks with command information disposed in each track, the command information being divided into individual instructions represented by cyclical patterns, each command instruction being determined by a selected number of cycles, controllable means coupled to the storage device for addressing selected tracks thereon, means responsive to selected tracks of the storage device for deriving pulse sequences therefrom corresponding to the individual cyclic patterns, a plurality of counter-register means, means responsive to the pulse sequences and coupled to the counter-register means for entering separate pulse sequences to be counted in different individual ones of the counter-register means, and decoder means coupled to the counter-register means for controlling the operation of the means for addressing the storage device.

16. A device for providing controllable sequences of presentations determined in accordance with responses of an individual, including visual and aural presentation means, each of the visual and aural presentation means having indexed blocks of information and being controllable to address selected blocks, the aural presentation means also including a number of code group blocks representing a number of pre-response and post-response portions relative to each individual information block, means responsive to the command information from the pre-response portion and to the response information for selecting an individual post-response command, means responsive to the selected post-response command for operating the visual and aural presentation means to obtain the address of selected blocks of information, and means responsive to the obtaining of selected blocks of information for presenting information from the visual and aural presentation means.

17. A machine for providing controlled presentations of information in accordance with responses of an operator comprising information presentation means having blocks of information and being controllable to present selected blocks, a multitrack storage device bearing groups of command information having pre-response and post-response portions related to each block of information, means for deriving command information from individual tracks of said storage device, means controlled by the command information of the pre-response portion of a command information group for selecting the post-response portion of a selected group on a chosen track as a function of the response of the operator, and means responsive to the selected post-response portion of the associated group for controlling the information presentation means to subsequently present another block of information.

18. In a controlled presentation system, the combination comprising a storage medium having a number of parallel recorded tracks, the tracks containing sequential groups of command information and audio information, the command information being in the form of recorded sequences of cyclic waveforms, each sequence having a number of cycles representing different command information, means coupled to the storage medium for deriving the command information from the number of cycles in a command information group on a selected track, means responsive to the derived command information, and including a number of counter means, for storage of the command information, and means responsive to the stored command information and coupled to the storage medium for controlling the presentation of audio information.

19. A controlled display system for teaching applications comprising audio storage means including a storage medium having audio presentation information and recorded command information in the form of recorded sequences of cyclic waveforms, each sequence having a number of cycles representing different command information, the sequences being disposed in identifiable blocks on a recording medium, said command information including the direction of movement of the recording medium and the number of blocks to the next desired sequence, said recording medium being selectively movable in first and second directions, visual display means including a film medium and sequences of selectable frames of information, said film being selectively movable in first and second directions, means for deriving command information from a selected block on a selected track of the storage medium, means responsive to the command information for controlling the storage means and the visual display means to move the recording medium and the film medium to new selected positions, and means responsive to the new selected positions for presenting aural and visual information only after the next selected positions have been reached.

References Cited in the file of this patent

UNITED STATES PATENTS

| | | |
|---|---|---|
| 2,826,828 | Hamilton | Mar. 18, 1958 |
| 2,921,385 | Hamilton | Jan. 19, 1960 |
| 3,020,360 | Gratian et al. | Feb. 6, 1962 |

OTHER REFERENCES

RCA technical notes publication titled "Electronic Teaching Devices," RCA TN No. 51, Dec. 2, 1957.